(12) United States Patent
Kumazaki et al.

(10) Patent No.: US 8,941,873 B2
(45) Date of Patent: Jan. 27, 2015

(54) PROCESSING INSTRUCTION DEVICE, PROCESSING APPARATUS, AND NON-TRANSITORY COMPUTER READABLE MEDIUM

(71) Applicant: Fuji Xerox Co., Ltd., Minato-ku, Tokyo (JP)

(72) Inventors: Takafumi Kumazaki, Kanagawa (JP); Tokihiro Ishiyama, Kanagawa (JP); Masakazu Ketsuka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/139,305

(22) Filed: Dec. 23, 2013

(65) Prior Publication Data

US 2014/0355046 A1     Dec. 4, 2014

(30) Foreign Application Priority Data

May 31, 2013   (JP) .................................. 2013-115831

(51) Int. Cl.
  *G06F 3/12*   (2006.01)
  *G06K 15/00*  (2006.01)
  *H04N 1/00*   (2006.01)

(52) U.S. Cl.
  CPC ......... *H04N 1/0035* (2013.01); *H04N 1/00278* (2013.01)
  USPC ........ 358/1.15; 358/1.13; 358/1.14; 358/1.18

(58) Field of Classification Search
  USPC ............ 358/1.15, 1.14, 1.13, 1.18, 462, 471, 358/474, 476, 505, 508, 452; 717/178, 171, 717/168, 173, 172, 102, 174, 114; 705/5, 705/62, 67, 14.4; 713/1, 161, 176, 182
  See application file for complete search history.

(56) References Cited

U.S. PATENT DOCUMENTS

2002/0144257 A1 * 10/2002 Matsushima ................. 717/178
2007/0046996 A1 *  3/2007 Matsuda ..................... 358/1.18

FOREIGN PATENT DOCUMENTS

JP            2012-113390 A      6/2012

* cited by examiner

*Primary Examiner* — Ngon Nguyen
(74) *Attorney, Agent, or Firm* — Sughrue Mion, PLLC (57) ABSTRACT

A processing instruction device includes a memory, a display instruction data acquisition unit, a specifying unit, a display controller, an operation data acquisition unit, and a processing instruction unit. The memory stores processing instruction data, processing identification data, and processing attribute data. The display instruction data acquisition unit acquires display instruction data. If the display instruction data includes processing identification data which is not stored in the memory, the specifying unit specifies alternative processing instruction data. The display controller causes a display device to display an image which prompts a user to select the alternative processing instruction data. If the operation data acquisition unit acquires operation data indicating selection of processing instruction data, the processing instruction unit instructs at least one of an image forming device, an imaging device, and a data communication device to perform a processing operation in accordance with the acquired processing instruction data.

8 Claims, 8 Drawing Sheets

| USER ID | AUTHENTICATION CODE | PRIVILEGE DATA |
|---|---|---|
| ... | ... | ... |
| ... | ... | ... |
| ... | ... | ... |

| PROCESSING ID | PROCESSING NAME | PROCESSING ATTRIBUTE ||| PROCESSING INSTRUCTION DATA |
| --- | --- | --- | --- | --- | --- |
| | | FUNCTION | KEYWORD | DESCRIPTION | |
| . . . | . . . | . . . | . . . | . . . | . . . |
| . . . | . . . | . . . | . . . | . . . | . . . |
| . . . | . . . | . . . | . . . | . . . | . . . |

FIG. 6

USER ID: 1234
NAME OF SOURCE PROCESSING APPARATUS: PROCESSING APPARATUS 001

| DISPLAY POSITION | ORIGINAL | | | | |
|---|---|---|---|---|---|
| | PROCESSING ID | PROCESSING NAME | PROCESSING ATTRIBUTE | | UNAVAILABILITY FLAG |
| | | | FUNCTION | KEYWORD | DESCRIPTION | |
| 1 | ... | ... | ... | ... | ... | ... |
| 2 | ... | ... | ... | ... | ... | ... |
| ... | ... | ... | ... | ... | ... | ... |

| DISPLAY POSITION | ALTERNATIVE | | | | | | |
|---|---|---|---|---|---|---|---|
| | PROCESSING ID | PROCESSING NAME | PROCESSING ATTRIBUTE | | | MATCHING POINT | RE-SELECTION FLAG |
| | | | FUNCTION | KEYWORD | DESCRIPTION | | |
| 1 | ... | ... | ... | ... | ... | ... | ... |
| 2 | ... | ... | ... | ... | ... | ... | ... |
| ... | ... | ... | ... | ... | ... | ... | ... |

PROCESSING INSTRUCTION DEVICE, PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-115831 filed May 31, 2013.

BACKGROUND (i) Technical Field

The present invention relates to a processing instruction device, a processing apparatus, and a non-transitory computer readable medium.

(ii) Related Art

Some of various processing apparatuses, for example, image forming apparatuses such as printers, imaging apparatuses such as scanners, data communication apparatuses such as facsimile machines, or multi-functional apparatuses having these functions integrated into single units, are configured to download additional programs from server devices via, for example, networks and to install the programs to obtain extension of functions.

SUMMARY

According to an aspect of the invention, there is provided a processing instruction device including a memory, a display instruction data acquisition unit, a specifying unit, a display controller, an operation data acquisition unit, and a processing instruction unit. The memory stores one or more processing instruction data items each instructing at least one of an image forming device, an imaging device, and a data communication device to perform a processing operation, one or more processing identification data items each identifying one of the one or more processing instruction data items, and one or more processing attribute data items each indicating an attribute of a processing operation indicated by one of the one or more processing instruction data items. The display instruction data acquisition unit acquires a display instruction data item for each of one or more processing instruction data items each instructing at least one of the image forming device, the imaging device, and the data communication device to perform a processing operation. The display instruction data item includes processing identification data items each identifying one of the one or more processing instruction data items, and processing attribute data items each indicating an attribute of a processing operation indicated by one of the one or more processing instruction data items. The display instruction data item is a data item for giving an instruction to display an image which prompts a user to select one of the one or more processing instruction data items. In a case where there is a processing identification data item which is included in the display instruction data item and which is not stored in the memory, the specifying unit specifies a processing attribute data item among the one or more processing attribute data items stored in the memory. The specifying unit further specifies, as an alternative processing instruction data item, a processing instruction data item corresponding to the specified processing attribute data items. The specified processing attribute data item is a processing attribute data item indicating an attribute satisfying a predetermined relationship with an attribute indicated by a processing attribute data item corresponding to the processing identification data item which is included in the display instruction data item and which is not stored in the memory. The display controller causes a display device to display an image which prompts a user to select, for a processing instruction data item identified by the processing identification data item which is included in the display instruction data item and which is not stored in the memory among the processing instruction data items identified by the processing identification data items included in the display instruction data item, an alternative processing instruction data item specified by the specifying unit instead of the processing instruction data item identified by the processing identification data item which is included in the display instruction data item and which is not stored in the memory, in accordance with the display instruction data item. The operation data acquisition unit acquires operation data indicating an operation of a user from an operation device that receives a user operation. In a case where the operation data acquisition unit acquires operation data indicating selection of one of one or more processing instruction data items from which a user is prompted to select a processing instruction data item using an image while the image is being displayed on the display device, the processing instruction unit instructs at least one of the image forming device, the imaging device, and the data communication device to perform a processing operation in accordance with the one processing instruction data item.

BRIEF DESCRIPTION OF THE DRAWINGS

An exemplary embodiment of the present invention will be described in detail based on the following figures, wherein.

DETAILED DESCRIPTION

A data processing system 1 according to an exemplary embodiment of the present invention will be described hereinafter. The data processing system 1 includes multiple processing apparatuses, and each of the multiple processing apparatuses provides a user with multiple functions such as printing, scanning, copying, and facsimile (fax) functions.

In each of the processing apparatuses included in the data processing system 1, a user menu screen (an image used as a user interface customized by a user to select a processing operation) is available. A user is able to set the individual settings to a user menu screen on each of the multiple processing apparatuses. However, the setting operation is time-consuming. In the data processing system 1, therefore, data indicating a user menu screen set by a user on a certain processing apparatus may be utilized on another processing apparatus. Accordingly, once a user sets the settings to a user menu screen on one of the processing apparatuses, the user may also be able to utilize the user menu screen on the other processing apparatuses without setting the individual settings to the user menu screen.

A processing operation available on some processing apparatuses may not necessarily be available on other processing apparatuses. In the data processing system 1, if a processing operation appearing on a user menu screen set on a certain processing apparatus has options including a processing operation not available on another processing apparatus, an alternative processing operation that is alternative to the processing operation which is not available may be displayed as an option on a user menu screen in the other processing apparatus. Thus, a user may be able to use a user menu screen having commonality between multiple processing apparatuses having different functions, which may be convenient.

Figure 1:
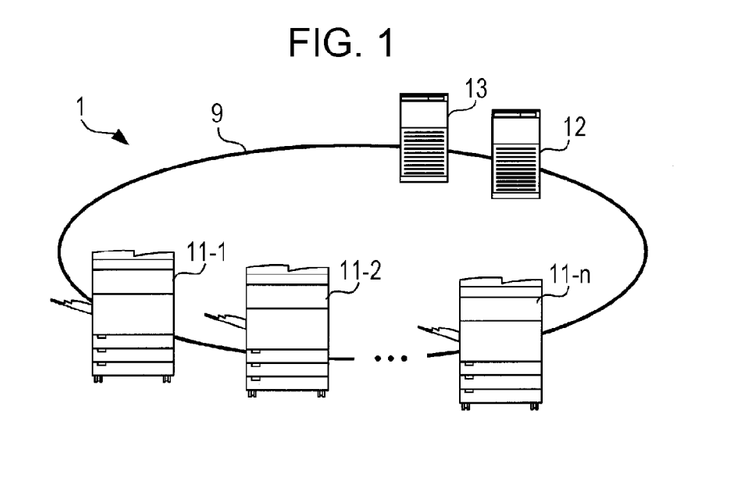
FIG. 1 illustrates an overall configuration of a data processing system according to an exemplary embodiment.

The configuration and operation of the data processing system 1 for implementing the functions described above will be described hereinafter. FIG. 1 illustrates an overall configuration of the data processing system 1. The data processing system 1 includes n processing apparatuses (where n is a natural number), namely, processing apparatuses 11-1, 11-2, . . . , and 11-*n*, a distribution server device 12, and an authentication server device 13. In the following description, the multiple processing apparatuses included in the data processing system 1 are collectively referred to as "processing apparatuses 11" or are each referred to as a "processing apparatus 11" unless they are distinguished from one another. Each of the processing apparatuses 11 may perform data communication with the distribution server device 12 and the authentication server device 13 via a network 9.

Each of the processing apparatuses 11 includes, for example, an image forming device, an imaging device, a data communication device, and so forth, and is configured to cause these devices to operate in association with one another to provide a user with various functions such as printing, scanning, copying, and facsimile (fax) functions. The same user may be able to use the multiple processing apparatuses 11.

The distribution server device 12 is a server device configured to store various data available on the processing apparatuses 11, such as a plug-in program, and to distribute, for example, requested data to a processing apparatus 11 in accordance with a distribution request from the processing apparatus 11.

The authentication server device 13 is a server device that serves to authenticate a user and to notify a processing apparatus 11 of functions available to the authenticated user among the various functions provided by the processing apparatus 11.

Figure 2:
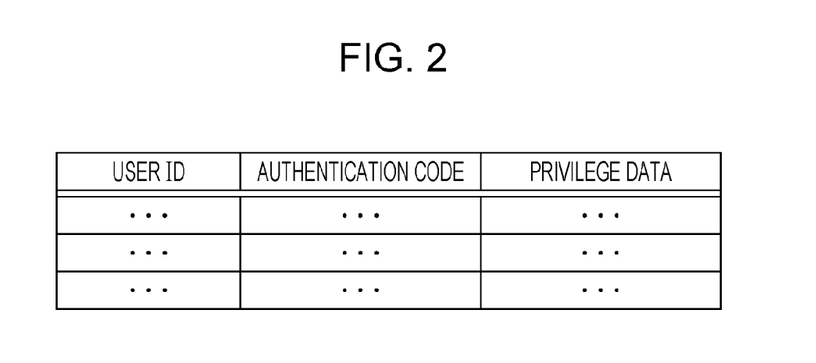
FIG. 2 illustrates a data configuration of a user authentication table according to the exemplary embodiment.

FIG. 2 illustrates a data configuration of a user authentication table managed by the authentication server device 13. The user authentication table is a collection of data records each relating to one of multiple users who use the data processing system 1, and each data record has data fields "user ID", "authentication code", and "privilege data".

The data field "user ID" stores user IDs each identifying a user. The data field "authentication code" stores authentication codes each of which is data uniquely assigned to a user and used with the user ID to verify the identity of the user. The data processing system 1 adopts a mechanism in which a user ID and an authentication code are stored in a near field communication (NFC) card possessed by a user and the user places the NFC card on or holds the NFC card above a processing apparatus 11, thereby allowing the processing apparatus 11 to read the user ID and the authentication code and transmit them to the authentication server device 13. The authentication server device 13 searches the user authentication table for the combination of user ID and authentication code which is transmitted from the processing apparatus 11, and determines, based on the success or failure of the search, whether the authentication of the user is successful or not.

The data field "privilege data" stores privilege data indicating functions available or not available to the corresponding user. The privilege data may be data indicating, for example, "color copying function: not available", "scanning function: available", "fax function: not available", "number of copies allowed: up to 50 per action", and so forth. If the authentication of the user is successful, the authentication server device 13 transmits the privilege data stored in the retrieved data record to the processing apparatus 11. The processing apparatus 11 may specify the function that the user is authorized to use on the basis of the privilege data transmitted from the authentication server device 13.

Figure 3:
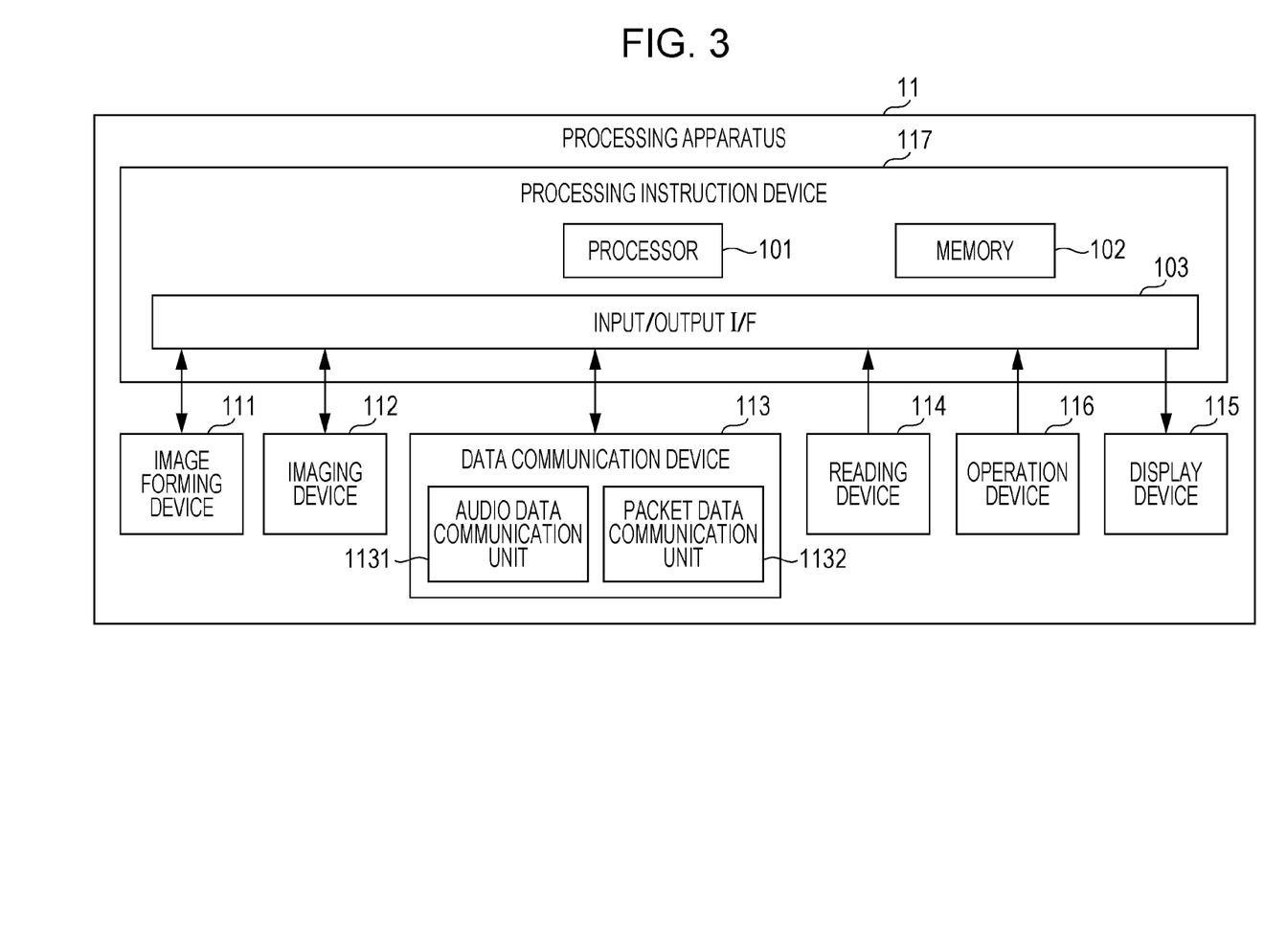
FIG. 3 illustrates a hardware configuration of a processing apparatus according to the exemplary embodiment.

FIG. 3 illustrates a hardware configuration of a processing apparatus 11. The processing apparatus 11 includes an image forming device 111, an imaging device 112, a data communication device 113, a reading device 114, a display device 115, an operation device 116, and a processing instruction device 117.

The image forming device 111 is a device configured to form an image on a sheet-shaped recording medium such as a sheet of paper using, for example, electrophotography. The printing method of the image forming device 111 is not limited to electrophotography, and any other method such as an inkjet printing method may be used. Some of the processing apparatuses 11 are capable of color printing, and others are capable of monochrome printing only.

The imaging device 112 is a device configured to optically read an image formed on a sheet-shaped recording medium placed on a document table to generate image data indicating the image.

The data communication device 113 is a device configured to transmit and receive various data to and from an external device. The data communication device 113 includes an audio data communication unit 1131 that performs audio data communication with an external facsimile (fax) device or the like via a telephone communication network, and a packet data communication unit 1132 that performs packet data communication with another processing apparatus 11, the distribution server device 12, the authentication server device 13, or the like via a packet data network.

The reading device 114 is a device (card reader) configured to read the user ID and authentication code recorded on an NFC card that is placed on or held above the reading device 114 by a user in accordance with the NFC standard. When a user brings an NFC card to the reading device 114 in a shorter distance than, for example, approximately 5 centimeters, the NFC card starts wireless communication by electric power induced by an electromagnetic wave emitted from the reading device 114, and transmits the user ID and the authentication code to the reading device 114 via radio transmission. The reading device 114 receives the user ID and authentication code transmitted from the NFC card to read the data recorded on the NFC car.

The display device 115 may be, for example, a liquid crystal display, and is configured to display various images such as a user menu screen. The operation device 116 may be, for example, a touch panel, and is configured to receive a touch operation performed by a user and generate operation data indicating the content of the touch operation. In the processing apparatus 11, the display device 115 and the operation device 116 may be stacked on each other to form a touch display. A user touches an image of an operator displayed on the display device 115 to experience intuitive interactions with the processing apparatus 11.

The processing instruction device 117 is a device configured to instruct the image forming device 111, the imaging device 112, or the data communication device 113 to execute the function selected by the user in accordance with a user operation on the operation device 116. The processing instruction device 117 includes a processor 101 configured to perform various data processing operations, a memory 102 configured to store various data, and an input/output interface (I/F) 103 configured to input and output various data to and from the other devices included in the processing apparatus 11. The processor 101 performs various data processing operations in accordance with a program stored in the memory 102, thereby serving as a device including the components described below.

Figure 4:
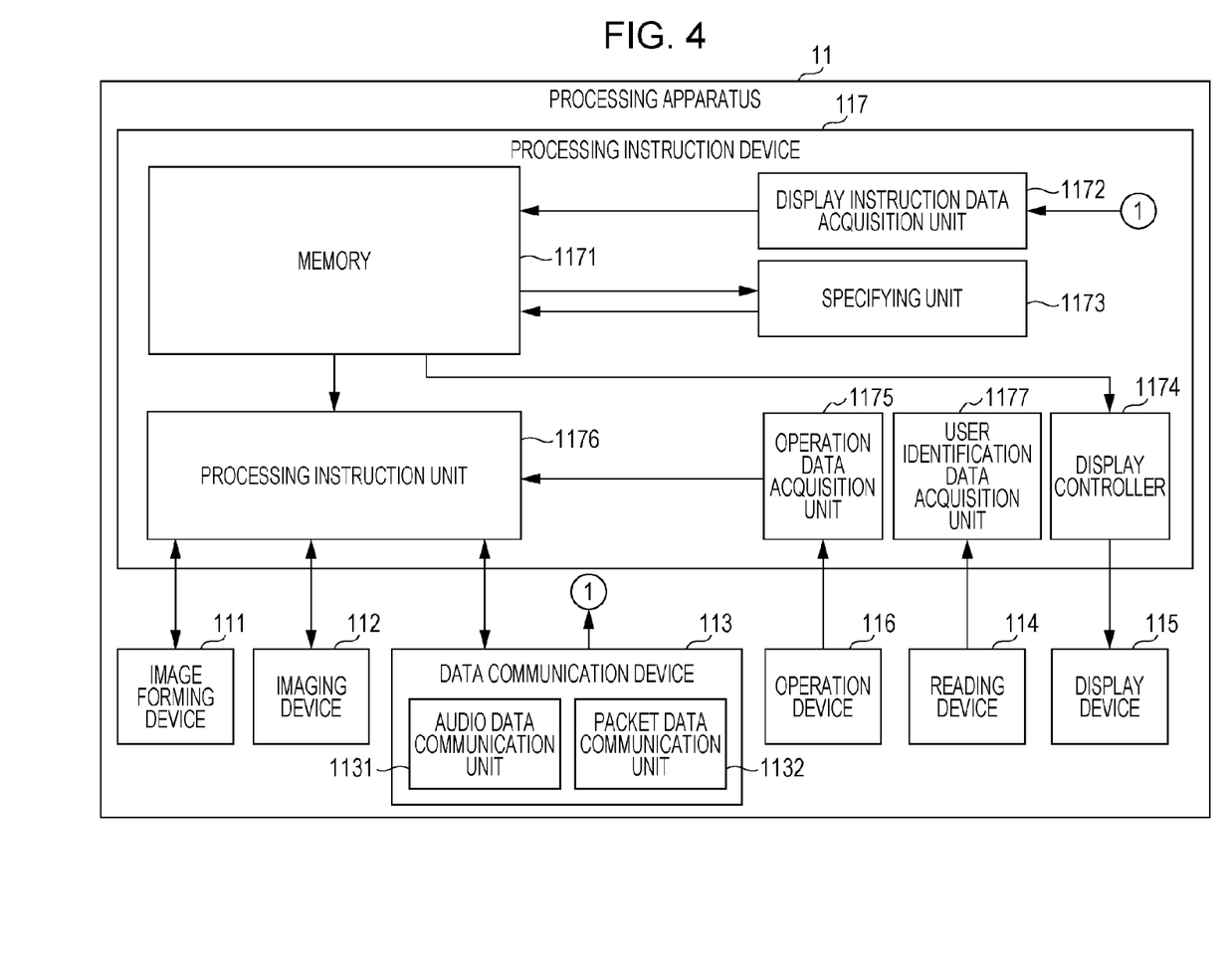
FIG. 4 illustrates a functional configuration of a processing instruction device according to the exemplary embodiment.

FIG. 4 illustrates a functional configuration of the processing instruction device 117. In FIG. 4, the devices included in the processing apparatus 11, other than the processing instruction device 117, are also illustrated in order to demonstrate relationships between transmission and reception of data between the processing instruction device 117 and the other devices included in the processing apparatus 11.

The processing instruction device 117 includes, as functional components, a memory 1171, a display instruction data acquisition unit 1172, a specifying unit 1173, a display controller 1174, an operation data acquisition unit 1175, a processing instruction unit 1176, and a user identification data acquisition unit 1177.

The memory 1171 stores data to be used by the processing instruction device 117 to instruct the image forming device 111 and the like to perform various processing operations. Specifically, the memory 1171 stores management data and display instruction data. The management data is data for managing multiple processing operations executable by the processing apparatus 11. The display instruction data is data for giving an instruction to display a user menu screen.

Figure 5:
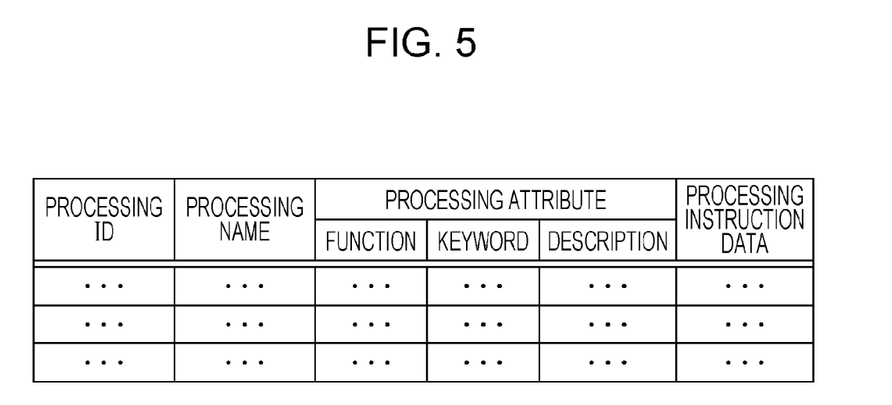
FIG. 5 illustrates a data configuration of management data according to the exemplary embodiment.

FIG. 5 illustrates a data configuration of management data. The management data is a collection of data records each relating to a processing operation executable by a processing apparatus 11. Each data record has data fields "processing ID", "processing name", "processing attribute", and "processing instruction data". The data field "processing attribute" includes sub-fields "function", "keyword", and "description". In the following description, the sub-field "YYYY" in the data field "XXXX" is represented by the data field "XXXX-YYYY".

The data field "processing ID" stores processing IDs each identifying a processing operation. The data field "processing name" stores processing names, for example, "normal copy".

The data field "processing attribute" is a data field that stores processing attribute data indicating the attributes of a processing operation. The sub-field "function" stores data indicating a function (or more than one function) used in the processing operation, such as "printing", among printing, copying, scanning, and fax functions. The sub-field "keyword" stores keywords (generally, multiple keywords) indicating the features of the processing operation, such as "normal", "color", and "large volume". The sub-field "description" stores data indicating a description of the content of the processing operation, such as "typical A4 portrait single-sided copying (monochrome, one copy) will be performed."

The data field "processing instruction data" stores processing instruction data indicating the specific procedure or the like of the processing operations. The processing instruction data may be, for example, a code list for invoking a native module (built-in module) or plug-in module (module downloaded from the distribution server device 12 and installed into the processing apparatus 11) that is a program installed into the processing apparatus 11 to control the image forming device 111, the imaging device 112, the data communication device 113, and so forth. The form of the processing instruction data is not limited to code list, and, for example, a program itself may be handled as processing instruction data.

Figure 6:
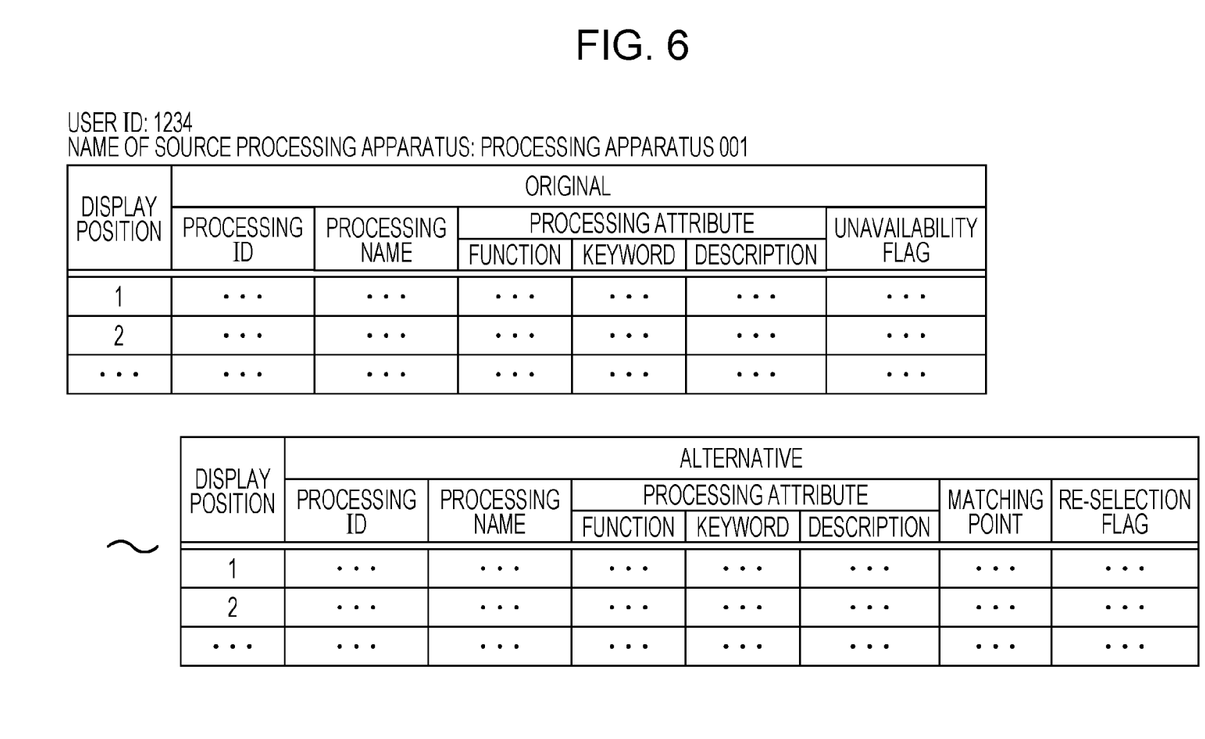
FIG. 6 illustrates a data configuration of display instruction data according to the exemplary embodiment.

The display instruction data stored in the memory 1171 together with the management data described above is data for giving an instruction to display a user menu screen set by a user. FIG. 6 illustrates a data configuration of the display instruction data. The display instruction data is generated for each user, and is thus associated with a user ID identifying the corresponding user. The display instruction data is a collection of data records each relating to one of multiple selection buttons (or operators) displayed on a user menu screen, and each data record has data fields "display position", "original", and "alternative".

The data field "display position" stores display position IDs each identifying the display position of a selection button on the user menu screen. For example, the display position ID "1" indicates the leftmost position on the first page of the user menu screen. The data records included in the display instruction data are sorted in ascending order by the values in the data field "display position".

The data field "original" stores a copy of the data records (except the processing instruction data) in the management data (FIG. 5) for processing operations registered by the user in the user menu screen using a user menu "Create New" screen described below. Thus, similarly to the management data, the data field "original" has sub-fields "processing ID", "processing name", and "processing attribute", and the sub-field "processing attribute" has further sub-fields "function", "keyword", and "description".

As described above, the data stored in the data field "original" is data relating to processing operations registered by the user through a user menu "Create New" screen. This registration process may not necessarily be performed using the processing apparatus 11 which stores the display instruction data. Accordingly, the display instruction data is associated with, in addition to a user ID, a processing apparatus name identifying the processing apparatus 11 in which the data to be stored in the data field "original" has been generated.

As described above, the data field "original" is data relating to processing operations registered in another processing apparatus 11. Thus, all these processing operations may not necessarily be available on the processing apparatus 11 which stores the display instruction data. For this reason, the data field "original" further has sub-field "unavailability flag" as a data field that stores a flag indicating a processing operation (hereinafter referred to as an "unavailable processing operation") not available on the processing apparatus 11 which stores the display instruction data.

The data field "alternative" is a data field that stores a copy of data records (except the processing instruction data) in the management data (FIG. 5) for processing operations (hereinafter referred to as "alternative processing operations") that are alternative to processing operations identified by the data field "original—processing ID" among data records relating to unavailable processing operations, that is, among data records for which the flag is set in the data field "original—unavailability flag". Thus, similarly to the management data, the data field "alternative" also has sub-fields "processing ID", "processing name", and "processing attribute", and the sub-field "processing attribute" has further sub-fields "function", "keyword", and "description".

The data field "alternative" further has sub-fields "matching point" and "re-selection flag". The sub-field "matching point" stores matching points each indicating the degree of similarity between the attributes of an alternative processing operation and the attributes of the processing operation corresponding to the alternative processing operation (i.e., the processing operation for which the alternative processing operation is substituted).

The sub-field "re-selection flag" represents a flag that is set when it is probable that a processing operation which is more similar to the original processing operation than the previously registered alternative processing operation might have become available because of the reason such as a new plug-in module having been installed into the processing apparatus 11.

Referring back to FIG. 4, the description of the functional configuration of the processing instruction device 117 will be continued. The display instruction data acquisition unit 1172 acquires display instruction data from another processing apparatus 11 when the user operates the operation device 116 to make an instruction to copy display instruction data.

The procedure for acquiring the display instruction data by the display instruction data acquisition unit 1172 will be specifically as follows: First, the display instruction data acquisition unit 1172 generates a transmission request of display instruction data. The transmission request includes a user ID. The user ID is read by the reading device 114 from the NFC card of the user who is using the processing apparatus 11, and is acquired by the user identification data acquisition unit 1177 from the reading device 114.

The display instruction data acquisition unit 1172 instructs the packet data communication unit 1132 of the data communication device 113 to transmit the generated transmission request to another processing apparatus 11. In accordance with the instruction from the display instruction data acquisition unit 1172, the packet data communication unit 1132 transmits the transmission request to another processing apparatus 11, and receives display instruction data from the other processing apparatus 11 in response to the transmission request. The display instruction data received by the packet data communication unit 1132 is display instruction data stored, in association with the user ID included in the transmission request, in the other processing apparatus 11, which is the destination to which the transmission request has been transmitted.

The packet data communication unit 1132 delivers the display instruction data received from the other processing apparatus 11 to the display instruction data acquisition unit 1172. The display instruction data acquisition unit 1172 stores in the memory 1171 the display instruction data acquired from the other processing apparatus 11 via the packet data communication unit 1132.

The specifying unit 1173 specifies, as alternative processing candidates, processing operations whose attributes have a high degree of similarity to those of an unavailable processing operation among the processing operations available on the associated processing apparatus 11. Then, the specifying unit 1173 prompts the user to select an alternative processing operation among these alternative processing candidates, and specifies the candidate selected by the user as an alternative processing operation. The detailed operation of the specifying unit 1173 will be described below.

The display controller 1174 instructs the display device 115 to display a user menu screen in accordance with the display instruction data stored in the memory 1171. The display controller 1174 also instructs the display device 115 to display various screens other than a user menu screen.

When the user touches the screen currently being displayed on the display device 115, such as a user menu screen, in accordance with the display controller 1174, the operation data acquisition unit 1175 receives operation data indicating the touch operation from the operation device 116.

If the operation data acquisition unit 1175 acquires operation data indicating the operation on one of the selection buttons displayed on the user menu screen, the processing instruction unit 1176 instructs the image forming device 111, the imaging device 112, the data communication device 113, or the like to execute the processing operation in accordance with the processing instruction data corresponding to the selection button on which the operation indicated by the operation data has been performed.

The user identification data acquisition unit 1177 acquires from the reading device 114 the user ID read by the reading device 114 from the NFC card.

The foregoing description has been directed to the functional configuration of the processing instruction device 117. The operation of the data processing system 1 will now be described with reference to an example of screens displayed on the display device 115 in accordance with an instruction given by the display controller 1174 of the processing instruction device 117.

In order to use a user menu screen, the user first creates a new user menu screen using one of the processing apparatuses 11. The procedure for creating a new user menu screen will be described hereinafter in the context in which a user creates a new user menu screen using the processing apparatus 11-1, by way of example.

FIGS. 7A to 7E illustrate screens displayed on the display device 115 of the processing apparatus 11-1 in order to create a new user menu screen. First, the user performs a predetermined operation on the operation device 116. Then, a user menu operation screen (FIG. 7A) is displayed on the display device 115. When the user operates a "Create New" button on the user menu operation screen, a user menu "Create New" screen (FIG. 7B) is displayed on the display device 115.

Figure 7A:
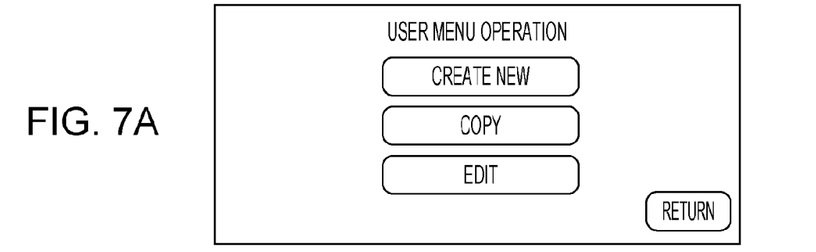
FIGS. 7A to 7E illustrate screens displayed on the processing apparatus according to the exemplary embodiment.
Figure 7B:
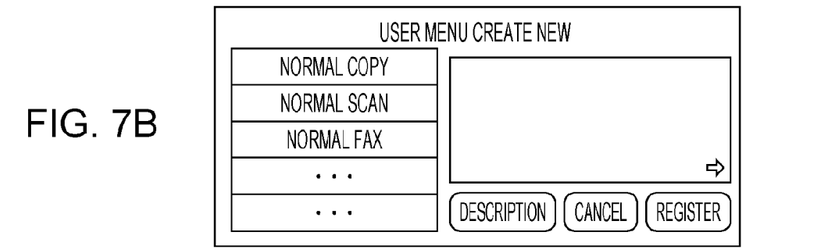
Figure 7C:
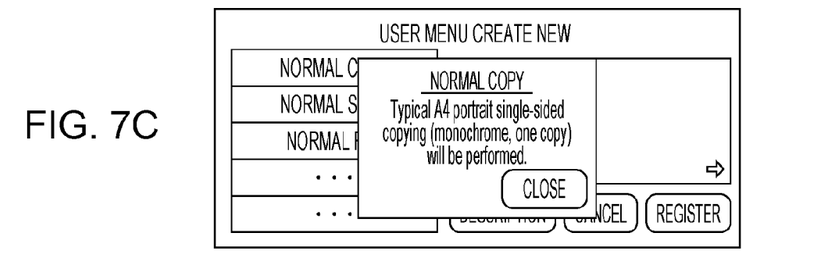
Figure 7D:
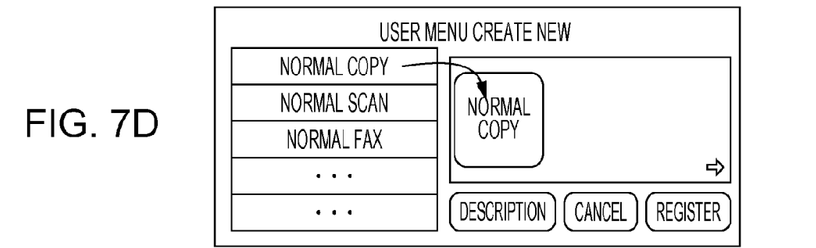

On the user menu "Create New" screen, the processing names of processing operations available on the processing apparatus 11-1 are displayed as a list (left portion of FIG. 7B). The processing names displayed in the list are the processing names stored in the data field "processing name" in the management data (FIG. 5). The user selects one of the processing names in the list, and then operates a "Description" button, thereby displaying the description of the selected processing operation in the pop-up window (FIG. 7C) to check the content of the processing operation. After checking the content of the displayed description of the processing operation, if necessary, the user drags the processing name of the processing operation for which the selection button is to be displayed on the user menu screen to the desired position in the frame in the right portion (design area) from the list (FIG. 7D), thereby being able to design a user menu screen.

The user repeatedly drags processing names to the design area from the list, if necessary. When the design of the user menu screen is completed, the user operates a "Register" button to complete the creation of a new user menu screen. In response to the operation of the "Register" button, the processing instruction device 117 generates display instruction data (FIG. 6) for giving an instruction to display the user menu screen designed by the user, and stores the generated display instruction data in the memory 1171. At this time, no data is stored in the data field "alternative" of the display instruction data.

Then, when the user performs a predetermined operation on the operation device 116, the display controller 1174 of the processing instruction device 117 instructs the display device 115 to display a user menu screen in accordance with the display instruction data stored in the memory 1171. As a result, the user menu screen designed by the user (FIG. 7E) is displayed on the display device 115. Selection buttons corresponding to the processing operations selected by the user are displayed on the user menu screen.

Figure 7E:
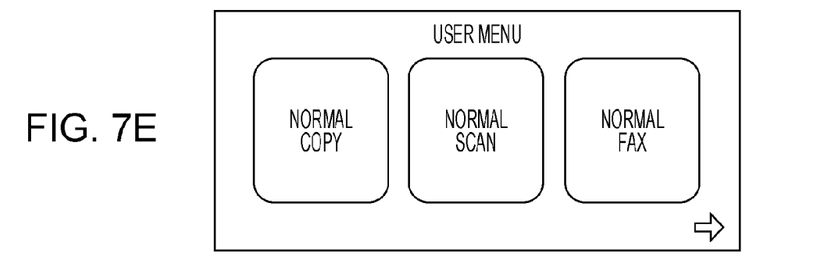

When the user operates one of the selection buttons on the user menu screen, the operation data acquisition unit 1175 of the processing instruction device 117 acquires operation data indicating this operation from the operation device 116, and delivers the operation data to the processing instruction unit 1176. The processing instruction unit 1176 specifies the operated selection button using the delivered operation data, and reads the processing instruction data corresponding to the specified selection button from the management data stored in the memory 1171. Then, the processing instruction unit 1176 instructs another device such as the image forming device 111 to perform the processing operation in accordance with the read processing instruction data. The image forming device 111 or the like executes the processing operation in accordance with the instruction, thereby providing a service to the user.

Once the user sets the settings to a user menu screen using the processing apparatus 11-1 in the manner described above, the user copies the display instruction data to another processing apparatus 11, thereby being able to use a similar user menu screen also on the other processing apparatus 11. In the following description, copying of display instruction data so that a user menu screen similar to a user menu screen set on a certain processing apparatus 11 is made available on another processing apparatus 11 is referred to as "copying of a user menu screen", for convenience of description. The operation of the data processing system 1 involved in copying a user menu screen from the processing apparatus 11-1 to the processing apparatus 11-2, by way of example, will be described hereinafter.

Figure 8A:
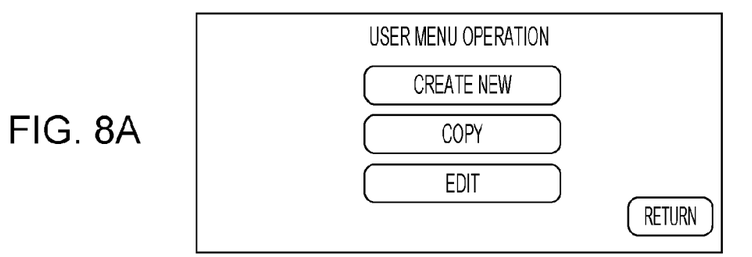
FIGS. 8A to 8E illustrate screens displayed on the processing apparatus according to the exemplary embodiment.

FIGS. 8A to 8E illustrate screens displayed on the display device 115 of the processing apparatus 11-2, which is the destination processing apparatus 11 to which a user menu screen is to be copied, in the operation of copying a user menu screen. First, the user operates a "Copy" button on a user menu operation screen (FIG. 8A). Then, a user menu copy screen (FIG. 8B) is displayed on the display device 115. On the user menu copy screen, the name of the processing apparatus 11 for which the settings of the user menu screen are currently being set (the processing apparatus 11 which stores the display instruction data) among the multiple processing apparatuses 11 included in the data processing system 1 is displayed as a list (left portion of FIG. 8B). In the illustrated example, the name of the processing apparatus 11-1 is displayed in the list.

Figure 8B:
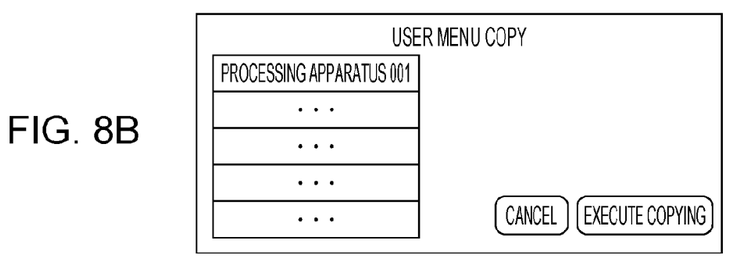

When the user selects the name of the source processing apparatus 11-1 from which the user menu screen is to be copied from the list and then operates an "Execute copying" button, the display instruction data acquisition unit 1172 of the processing instruction device 117 acquires display instruction data from the processing apparatus 11-1 selected by the user via the packet data communication unit 1132, and stores the display instruction data in the memory 1171.

When the display instruction data is stored in the memory 1171, the specifying unit 1173 extracts a data record for which a processing ID not included in the data field "processing ID" of the management data is stored in the data field "original—processing ID" among the data records in the display instruction data, and sets a flag in the data field "original—unavailability flag" for the extracted data record.

Figure 8C:
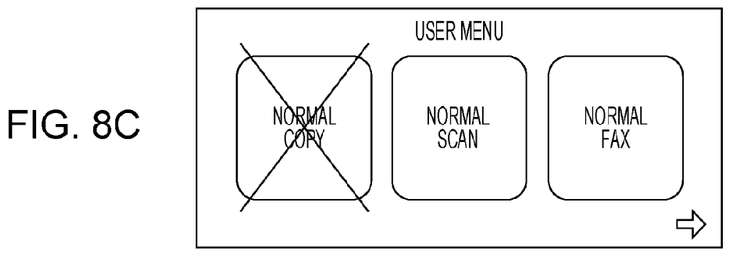

Thereafter, when the user performs a predetermined operation on the operation device 116, the display controller 1174 of the processing instruction device 117 instructs the display device 115 to display a user menu screen in accordance with the display instruction data. As a result, a user menu screen illustrated in FIG. 8C is displayed on the display device 115 of the processing apparatus 11-2. The selection button marked with a cross ("x") on the user menu screen is a selection button corresponding to a processing operation (unavailable processing operation) for which the unavailability flag is set in the display instruction data. That is, in the illustrated example, the processing operation "normal copy" is not available on the processing apparatus 11-2, and thus the associated selection button is marked with a cross ("x").

When the user operates the selection button marked with a cross ("x"), the specifying unit 1173 searches the display instruction data for a data record relating to the processing operation corresponding to the operated selection button, and extracts, from the management data, a data record storing data having high similarity to the data in the data fields "original—processing attribute—function" and "original—processing attribute—keyword" for the retrieved data record (hereinafter referred to as the "data record in the display instruction data").

Specifically, the specifying unit 1173 first extracts, from the management data, a data record for which the same data as the data stored in the data field "original—processing attribute—function" for the data record in the display instruction data is stored in the data field "processing attribute—function".

Then, the specifying unit 1173 calculates, as a matching point, the number of keyword matches, for each of the data records extracted from the management data (hereinafter referred to as a "data record in the management data"), between the keywords stored in the data field "processing attribute—keyword" and the keywords stored in the data field "original—processing attribute—keyword" for the data record in the display instruction data.

That is, a higher matching point is calculated for a processing operation that uses the same functions as the unavailable processing operation and that is assigned a larger number of keywords identical to the keywords assigned to the unavailable processing operation among the processing operations available on the associated processing apparatus, namely, the processing apparatus 11-1.

Then, the specifying unit 1173 sorts the data records extracted from the management data in descending order from the highest to the lowest matching point, and specifies a predetermined number of (for example, five) data records having high matching points as data records of alternative processing candidates.

Figure 8D:
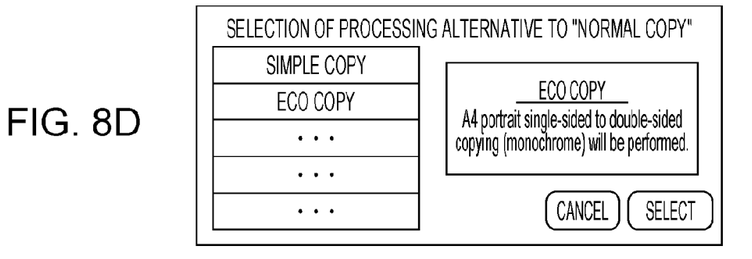

When the specifying unit 1173 completes the specification of data records of alternative processing candidates in the manner described above, the display controller 1174 causes an alternative processing selection screen illustrated in FIG. 8D to be displayed on the display device 115. On the alternative processing selection screen, alternative processing candidates specified by the specifying unit 1173 are displayed as a list (left portion of FIG. 8D).

When the user selects one of the alternative processing candidates from the list, the description of the selected alternative processing candidate is displayed in a description field (right portion of FIG. 8D). The user checks the content of the description, and determines whether or not the alternative processing candidate is to be displayed on the user menu screen as an alternative processing operation. When the user checks the content of the description, if necessary, and then operates a "Select" button, the currently selected alternative processing candidate is registered in the display instruction data as an alternative processing operation. That is, data relating to an alternative processing candidate selected by the user is stored in the data field "alternative" of the display instruction data.

Figure 8E:
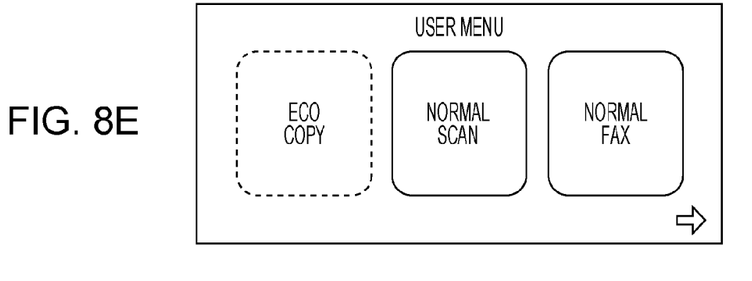

Thereafter, when a user menu screen is displayed on the processing apparatus 11-2, a user menu screen illustrated in FIG. 8E is displayed on the processing apparatus 11-2 in accordance with the display instruction data in which the data of the alternative processing operation has been registered. On the user menu screen, the frame of the selection button corresponding to the alternative processing operation is indicated by a broken line, which may allow the user to distinguish the alternative processing operation from the non-alternative processing operations.

As described above, in some cases, a processing operation which is more similar to the original processing operation than the alternative processing operations previously registered in the user menu screen may become available on the processing apparatus 11-2 because of the reason such as a new plug-in module having been installed into the processing apparatus 11-2 after the settings to the user menu screen were completed in the processing apparatus 11-2. In addition, when the user modifies the user menu screen in the processing apparatus 11-1, the modification is also reflected in the user menu screen on the processing apparatus 11-2, which utilizes a copy thereof. In this case, there may be a processing operation which is more similar to the original processing operation (the processing operation modified in the processing apparatus 11-1) than the alternative processing operations previously registered in the user menu screen in the processing apparatus 11-2.

Accordingly, the data processing system 1 has a mechanism for prompting a user to re-select an alternative processing operation in a case where a processing operation available on a processing apparatus 11 is changed or in a case where, as a result of the display instruction data having been modified in the source processing apparatus 11 from which the data field "original" of the display instruction data is to be copied, the display instruction data therein is changed.

For example, if the user changes a processing operation to be registered in the selection button at the top (leftmost on the first page) on the user menu screen in the processing apparatus 11-1, the data stored in the data field "original" for the data record in the first row of the display instruction data in the processing apparatus 11-1 is changed.

The display instruction data acquisition unit 1172 of the processing apparatus 11-2 acquires display instruction data from the processing apparatus 11-1, which is the source from which the display instruction data in the processing apparatus 11-2 is copied, at intervals of, for example, a predetermined time period (for example, every 24 hours). The specifying unit 1173 updates the display instruction data in the processing apparatus 11-2 so that the data in the data field "original" of the display instruction data in the processing apparatus 11-2 matches the data in the data field "original" of the display instruction data acquired from the processing apparatus 11-1.

The specifying unit 1173 updates the unavailability flag for the updated data record in the display instruction data in the processing apparatus 11-2. In this case, for a data record for which the flag is still set in the data field "original—unavailability flag" both before and after the update, an alternative processing operation which is more desirable than the currently selected alternative processing operation may be obtained. Accordingly, the specifying unit 1173 sets a flag in the data field "alternative—re-selection flag" for the data record.

In addition, for example, in a case where a processing operation available on the processing apparatus 11-2 is changed because of the reason such as a new plug-in module having been installed into the processing apparatus 11-2, the management data in the processing apparatus 11-2 is updated. In this case, the specifying unit 1173 also updates the data field "original-unavailability flag" of the display instruction data. Also in this case, for a data record for which the flag is still set in the data field "original—unavailability flag" both before and after the update, an alternative processing operation which is more desirable than the currently selected alternative processing operation may be obtained. Accordingly, the specifying unit 1173 sets a flag in the data field "alternative—re-selection flag" for the data record.

Figure 9A:
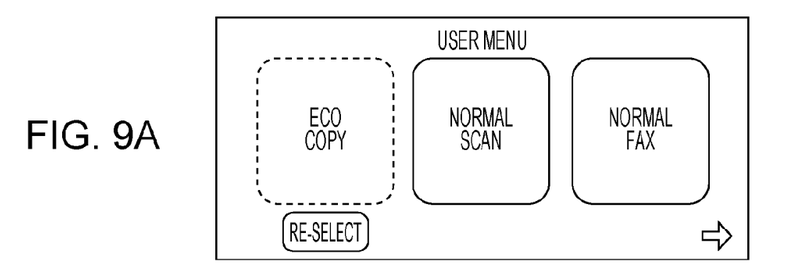
FIGS. 9A and 9B illustrate screens displayed on the processing apparatus according to the exemplary embodiment.

FIG. 9A illustrates a user menu screen displayed in accordance with display instruction data including a data record for which a flag is set in the data field "alternative—re-selection flag". That is, a "Re-select" button for prompting a user to re-select an alternative processing operation is displayed below the selection button corresponding to the data record for which a flag is set in the data field "alternative—re-selection flag".

Figure 9B:
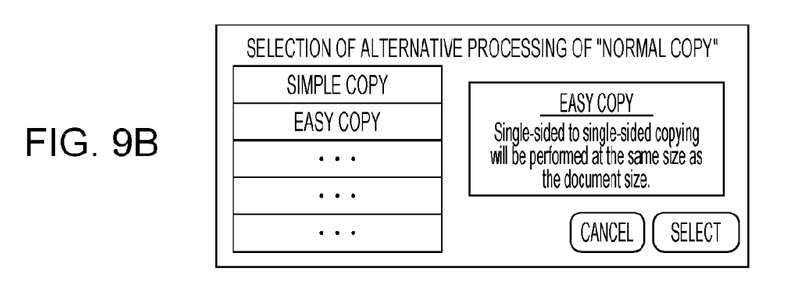

When the user operates the "Re-select" button, an alternative processing selection screen (FIG. 9B) is displayed so that the user may be able to re-select an alternative processing operation on the screen.

EXEMPLARY MODIFICATIONS

The present invention is not limited to the foregoing exemplary embodiment, and a variety of modifications may be made. Some exemplary modifications will be given hereinafter. Two or more of the following exemplary modifications may be used in combination.

First Exemplary Modification

In the foregoing exemplary embodiment, in order to share display instruction data (the data field "original" portion) between multiple processing apparatuses 11, a user operates the destination processing apparatus 11 to which the display instruction data is to be copied to acquire display instruction data from the source processing apparatus 11. However, the method for sharing display instruction data between multiple processing apparatuses 11 is not limited to the method described above. For example, a management server device configured to manage display instruction data on a user-by-user basis may be provided, and each processing apparatus 11 may acquire display instruction data associated with each individual user from the management server device to share display instruction data between the multiple processing apparatuses 11. Alternatively, for example, each time a predetermined time period has elapsed, each processing apparatus 11 may broadcast display instruction data stored therein to other processing apparatuses 11, and, upon receiving new display instruction data broadcast from another processing apparatus 11, update the display instruction data stored therein using the received display instruction data so that the display instruction data stored in each of the multiple processing apparatuses 11 may be synchronized with the display instruction data stored in the other processing apparatuses 11.

Second Exemplary Modification

In the foregoing exemplary embodiment, user authentication is performed by checking the user ID and authentication code recorded on an NFC card against those in the authentication server device 13. The user authentication method is not limited to that described above, and any other method may be used to authenticate a user. For example, the user may input a user ID and a password to the operation device 116, and the input data may be checked against that in the authentication server device 13. In addition, the location where verification for authentication is to be performed is not limited to the authentication server device 13. For example, each of the processing apparatuses 11 may store a user authentication table, and may perform verification for authentication.

Third Exemplary Modification

In the foregoing exemplary embodiment, user menu screens are used on a user-by-user basis. A custom menu screen which is commonly available to all users may be used instead of or in addition to a user menu screen.

Fourth Exemplary Modification

In the foregoing exemplary embodiment, the processing instruction device 117 is integrated with other devices such as the image forming device 111 into the processing apparatus 11. Alternatively, the processing instruction device 117 may be formed as a device independent of the processing apparatus 11. For example, a computer such as a slate personal computer (PC) having a touch display may be caused to execute processing in accordance with the program according to the exemplary embodiment disclosed herein, thereby causing the computer to function as the processing instruction device 117. In this case, a processing apparatus 11 which does not include the processing instruction device 117 and the processing instruction device 117 implemented by the computer may communicate data to each other via wired or wireless connections.

Fifth Exemplary Modification

In the foregoing exemplary embodiment, each of the processing apparatuses 11 includes the image forming device 111, the imaging device 112, and the data communication device 113. However, each of the processing apparatuses 11 may have any other device configuration. For example, each of the processing apparatuses 11 may not necessarily include some of these devices, and may further include any additional device. Alternatively, instead of the processing apparatuses 11, any other type of device may be used. That is, any processing apparatus capable of executing multiple processing operations and configured to execute a processing operation selected by a user from among the multiple processing operations may be used.

Sixth Exemplary Modification

In the foregoing exemplary embodiment, in order to specify an alternative processing candidate, the degree of similarity between two different processing operations is determined by counting the number of matches between the keywords assigned to these processing operations. The method for determining the degree of similarity between two different processing operations is not limited to that described above. Any method for determining the degree of similarity between the attributes of the original processing operation and the attributes of an available processing operation may be used. For example, a weight may be assigned to each keyword in accordance with the degree of importance, and the weights of matching keywords may be added together to calculate a matching point. In addition, the data to be used to determine a degree of similarity is not limited to keywords, and, for example, the degree of similarity of code included in processing instruction data may be determined.

Seventh Exemplary Modification

In the foregoing exemplary embodiment, a user selects an alternative processing operation from alternative processing candidates, thereby specifying an alternative processing operation. The method for specifying an alternative processing operation is not limited to the configuration described above. For example, the specifying unit 1173 may be configured to set, as an alternative processing operation, a processing operation having the highest degree of similarity in index such as matching point without requiring a user to select an alternative processing operation.

Eighth Exemplary Modification

In the foregoing exemplary embodiment, the processing instruction device 117 is implemented by the processor 101 performing processing in accordance with a program. The processing instruction device 117 may be formed as a dedicated device.

Ninth Exemplary Modification

In the foregoing exemplary embodiment, no discussion has been made of the form how a program to be executed by the processor 101 in the processing instruction device 117 is provided. The program may be provided in the form of being recorded on a computer-readable recording medium such as a magnetic recording medium, an optical recording medium, a magneto-optical recording medium, or a semiconductor memory, or may be provided in the form being downloaded via a network such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing instruction device comprising:
a memory that stores one or more processing instruction data items each instructing at least one of an image forming device, an imaging device, and a data communication device to perform a processing operation, one or more processing identification data items each identifying one of the one or more processing instruction data items, and one or more processing attribute data items each indicating an attribute of a processing operation indicated by one of the one or more processing instruction data items;
a display instruction data acquisition unit that acquires a display instruction data item for each of one or more processing instruction data items each instructing at least one of the image forming device, the imaging device, and the data communication device to perform a processing operation, the display instruction data item including processing identification data items each identifying one of the one or more processing instruction data items, and processing attribute data items each indicating an attribute of a processing operation indicated by one of the one or more processing instruction data items, the display instruction data item being a data item for giving an instruction to display an image which prompts a user to select one of the one or more processing instruction data items;

a specifying unit that, in a case where there is a processing identification data item which is included in the display instruction data item and which is not stored in the memory, specifies a processing attribute data item among the one or more processing attribute data items stored in the memory and specifies, as an alternative processing instruction data item, a processing instruction data item corresponding to the specified processing attribute data items, the specified processing attribute data item being a processing attribute data item indicating an attribute satisfying a predetermined relationship with an attribute indicated by a processing attribute data item corresponding to the processing identification data item which is included in the display instruction data item and which is not stored in the memory;

a display controller that causes a display device to display an image which prompts a user to select, for a processing instruction data item identified by the processing identification data item which is included in the display instruction data item and which is not stored in the memory among the processing instruction data items identified by the processing identification data items included in the display instruction data item, an alternative processing instruction data item specified by the specifying unit instead of the processing instruction data item identified by the processing identification data item which is included in the display instruction data item and which is not stored in the memory, in accordance with the display instruction data item;

an operation data acquisition unit that acquires operation data indicating an operation of a user from an operation device that receives a user operation; and a processing instruction unit that, in a case where the operation data acquisition unit acquires operation data indicating selection of one of one or more processing instruction data items from which a user is prompted to select a processing instruction data item using an image while the image is being displayed on the display device, instructs at least one of the image forming device, the imaging device, and the data communication device to perform a processing operation in accordance with the one processing instruction data item.

2. The processing instruction device according to claim 1, further comprising:

a user identification data acquisition unit that acquires a user identification data item identifying a user, wherein the display instruction data acquisition unit acquires a display instruction data item by acquiring a display instruction data item associated with a user identification data item acquired by the user identification data acquisition unit from among a plurality of display instruction data items associated with different user identification data items.

3. The processing instruction device according to claim 1, wherein the specifying unit specifies, as one or more alternative processing instruction data candidates, one or more processing instruction data items corresponding to the specified processing attribute data item indicating the attribute satisfying the predetermined relationship, the display controller causes the display device to display an image which prompts a user to select one of the one or more alternative processing instruction data candidates, in a case where the operation data acquisition unit acquires operation data indicating selection of one of one or more alternative processing instruction data candidates from which a user is prompted to select an alternative processing instruction data candidate using an image while the image is being displayed on the display device, the specifying unit specifies the one alternative processing instruction data candidate as an alternative processing instruction data item, the memory stores, as an alternative processing identification data item, a processing identification data item identifying the alternative processing instruction data item specified by the specifying unit, and in a case where the memory has stored therein an alternative processing identification data item, the display controller causes the display device to display an image which prompts a user to select, for the processing instruction data item identified by the processing identification data item which is included in the display instruction data item and which is not stored in the memory among the processing instruction data items identified by the processing identification data items included in the display instruction data item, an alternative processing instruction data item identified by the alternative processing identification data item stored in the memory instead of the processing instruction data item identified by the processing identification data item which is included in the display instruction data item and which is not stored in the memory, in accordance with the display instruction data item.

4. The processing instruction device according to claim 3, wherein in a case where at least one of the one or more processing instruction data items stored in the memory is changed or in a case where the display instruction data item is changed, the specifying unit re-specifies an alternative processing instruction data candidate, the display controller causes the display device to display an image which prompts a user to select one alternative processing instruction data candidate among one or more alternative processing instruction data items including the alternative processing instruction data candidate re-specified by the specifying unit, in a case where the operation data acquisition unit acquires operation data indicating selection of one of one or more alternative processing instruction data candidates from which a user is prompted to select an alternative processing instruction data candidate using an image while the image is being displayed on the display device, the specifying unit specifies the one alternative processing instruction data candidate as a new alternative processing instruction data item, and the memory updates the alternative processing identification data item stored therein with a processing identification data item identifying the new alternative processing instruction data item specified by the specifying unit.

5. The processing instruction device according to claim 1, wherein
the display controller causes the display device to display an image in accordance with the display instruction data in such a manner that allows a user to distinguish an alternative processing instruction data item from a processing instruction data item that is not an alternative processing instruction data item in the image.

6. The processing instruction device according to claim 3, wherein
the display controller causes the display device to display an image in accordance with the display instruction data in such a manner that allows a user to distinguish an alternative processing instruction data item from a processing instruction data item that is not an alternative processing instruction data item in the image.

7. A processing apparatus comprising:
the processing instruction device according to claim 1;
at least one of an image forming device, an imaging device, and a data communication device that performs a processing operation in accordance with an instruction made by the processing instruction unit of the processing instruction device;
a display device that displays a user interface under control of the display controller of the processing instruction device; and
an operation device that delivers operation data indicating an operation of a user to the operation data acquisition unit of the processing instruction device.

8. A non-transitory computer readable medium storing a program causing a computer to execute a process, the process comprising:
storing in a memory one or more processing instruction data items each instructing at least one of an image forming device, an imaging device, and a data communication device to perform a processing operation, one or more processing identification data items each identifying one of the one or more processing instruction data items, and one or more processing attribute data items each indicating an attribute of a processing operation indicated by one of the one or more processing instruction data items;
acquiring a display instruction data item for each of one or more processing instruction data items each instructing at least one of the image forming device, the imaging device, and the data communication device to perform a processing operation,
the display instruction data item including processing identification data items each identifying one of the one or more processing instruction data items, and processing attribute data items each indicating an attribute of a processing operation indicated by one of the one or more processing instruction data items,
the display instruction data item being a data item for giving an instruction to display an image which prompts a user to select one of the one or more processing instruction data items;
in a case where there is a processing identification data item which is included in the display instruction data item and which is not stored in the memory, specifying a processing attribute data item among the one or more processing attribute data items stored in the memory and specifying, as an alternative processing instruction data item, a processing instruction data item corresponding to the specified processing attribute data items,
the specified processing attribute data item being a processing attribute data item indicating an attribute satisfying a predetermined relationship with an attribute indicated by a processing attribute data item corresponding to the processing identification data item which is included in the display instruction data item and which is not stored in the memory;
causing a display device to display an image which prompts a user to select, for a processing instruction data item identified by the processing identification data item which is included in the display instruction data item and which is not stored in the memory among the processing instruction data items identified by the processing identification data items included in the display instruction data item, an alternative processing instruction data item specified in the specifying instead of the processing instruction data item identified by the processing identification data item which is included in the display instruction data item and which is not stored in the memory, in accordance with the display instruction data item;
acquiring operation data indicating an operation of a user from an operation device that receives a user operation; and
in a case where operation data indicating selection of one of one or more processing instruction data items from which a user is prompted to select a processing instruction data item using an image is acquired from the operation device while the image is being displayed on the display device, instructing at least one of the image forming device, the imaging device, and the data communication device to perform a processing operation in accordance with the one processing instruction data item.

* * * * *